(12) United States Patent
Lin (10) Patent No.: US 7,863,860 B2
(45) Date of Patent: Jan. 4, 2011

(54) BATTERY COVER

(76) Inventor: Jung Tsung Lin, 4F, No. 9, Alley 9, Lane 188, Sec. 1, Wunhua Rd., Banciao City, Taipei County (TW)

( * ) Notice: Subject to any disclaimer, the term of this patent is extended or adjusted under 35 U.S.C. 154(b) by 395 days.

(21) Appl. No.: 12/149,303

(22) Filed: Apr. 30, 2008

(65) Prior Publication Data

US 2009/0001931 A1 Jan. 1, 2009

(30) Foreign Application Priority Data

Jun. 29, 2007 (TW) .............................. 96123708 A (51) Int. Cl.
*H02J 7/00* (2006.01)

(52) U.S. Cl. ...................... 320/108; 320/110; 320/112; 320/114

(58) Field of Classification Search ................. 320/108
See application file for complete search history.

(56) References Cited

U.S. PATENT DOCUMENTS 7,567,824 B2 * 7/2009 Mickle et al. ............... 455/573
2006/0205381 A1 * 9/2006 Beart et al. .............. 455/343.1

* cited by examiner

*Primary Examiner*—Edward Tso
*Assistant Examiner*—Ahmed Omar
(74) *Attorney, Agent, or Firm*—Bacon & Thomas, PLLC (57) ABSTRACT

A battery cover suitable for being used to cover a battery groove of an electric appliance such as a game controller, a remote controller, a mobile phone, a multi-medium player, a wireless mouse, a flashlight, a PDA, a digital camera etc. to generate electric power in a wireless inducing mode, for charging chargeable batteries that can thus supply electric power for operation of an electric appliance. Therefore, when a user is desired to electrically charge the chargeable batteries, it needs not to take the chargeable batteries out of the electric appliance, but needs only to directly place the electric appliance in an effective wireless induction zone to make the battery cover generate electric power in a wireless inducing mode to charge the batteries.

17 Claims, 7 Drawing Sheets

BATTERY COVER

BACKGROUND OF THE INVENTION

1. Field of the Invention

The present invention relates to a battery cover for charging batteries in a non-touch induction mode; and especially to a battery cover for chargeable batteries for power supplying for an electric appliance, with the battery cover, the chargeable batteries can be charged without being taken out of the electric appliance.

2. Description of the Prior Art

Many articles and tools need to get electric power through batteries in use, for example, this is true for multi-medium players, wireless mice, flashlights, PDAs', digital cameras etc., while use of batteries and recovering of waste batteries often create environmental problems of quite large seriousness; in the recent years, chargeable batteries that can be reused repeatedly have been gradually preferably used by people, the batteries not only can lower the amount of waste batteries, but also can reduce consumers' expenses in purchasing new batteries.

Generally speaking, when power of chargeable batteries are exhausted, the chargeable batteries can be charged by means of an external electric power source, in which the electric energy is transformed into chemical energy and stored (the chargeable batteries can effect a chemical reversible reaction).

Therefore, when a problem of inadequacy of electric power of chargeable batteries used in an electric appliance, the following two modes are often used to charge the chargeable batteries mounted interiorly of the electric appliance:

First, a battery cover of the electric appliance is opened to take the batteries out of a battery groove, and to move the batteries to an external charging device for charging; and after charging, the chargeable batteries are taken out of the external charging device and put back in the electric appliance to make normal operation of the electric appliance. This mode of operation renders a user often necessary to remove and mount . . . the chargeable batteries.

Second, for the sake of avoiding the necessity for a user to often detach chargeable batteries, an electric charging circuit able to connect an external electric power source is provided in an electric appliance in the prior art, when the electric appliance is inadequate of electric power, the electric appliance is connected by inserting into the external electric power source, so that the external electric power source supplies electric power for the electric charging circuit to charge the chargeable batteries, and after charging, the external electric power source is drawn off the electric appliance to make normal operation of the electric appliance.

However, the second charging mode only suits those electric appliances provided on their selves with electric charging circuits, but does not suit normal electric appliances, for instance: a normal house TV remote controller does not have the effect of charging by connecting an external electric power source, and such mode of insertion connecting an external electric power source often is subjected to having the problems of damaging or press destroying, and to rendering dust to get in, oxidizing and humidifying related inserting pins, when a user owns a plurality of electric appliances such as: a game controller, a remote controller, a mobile phone, a multi-medium player, a wireless mouse, a flashlight, a PDA, a digital camera etc., each electric appliance needs a conductor for transmitting of an external electric power source, and each conductor has a transformer that occupies quite a large space, thereby the conductors will have the problems of becoming intercrossed to make a mess and uneasy to be collected and making confusion.

In view of the above stated, the inventor of the present invention developed a battery cover under the presupposition of unchanging the original design of an electric appliance, in order that after the electric appliance is given with the battery cover of the present invention, chargeable batteries do not need to be taken out of the electric appliance, and do not need to have the electric appliance inserted with a wired external electric power source when in charging the battery in a mode of wireless induction for getting the required electric power.

SUMMARY OF THE INVENTION

The primary object of the present invention is to provide a battery cover adapted to placing on an RF (radio frequency) emitter for generating electric power by a non-touch induction mode, the battery cover can be used to cover a battery groove of an electric appliance such as a game controller, a remote controller, a mobile phone, a multi-medium player, a wireless mouse, a flashlight, a PDA, a digital camera etc. to generate electric power in a wireless inducing mode, for charging chargeable batteries that can thus supply electric power for operation of an electric appliance.

The battery cover of the present invention comprises at least a cover, a set of pins in corresponding with the electrodes in the battery groove and a non-touch induction type electric power generating unit, the cover can be used to cover the battery groove of an electric appliance; the non-touch induction type electric power generating unit is provided in the cover, and includes a first harmonic oscillation circuit having a first coil, a rectifying wave filtering circuit connecting with the first harmonic oscillation circuit, and an electric charging circuit connecting with the rectifying wave filtering circuit to charge batteries; when the electric appliance loaded with the battery cover of the present invention is placed in an effective wireless inducing zone of the RF emitter, the battery cover can generate electric power in a wireless inducing mode to charge the batteries through the set of pins; in other words, common consumers need only to provide a battery cover of the present invention on a purchased electric appliance, he can make the electric appliance be electrically charged in the wireless inducing mode.

Secondly, the above mentioned non-touch induction type electric power generating unit can be hidden in the cover, and the pin set can be provided to protrude out of the cover and direct to the battery groove to electrically connect the chargeable batteries, this mode of setting up is suitable to be used in cooperating with chargeable batteries purchased in the markets, so that when the chargeable batteries are damaged or their storing function is used up, a consumer can buy new chargeable batteries for changing it by himself.

Alternatively, the chargeable batteries can be built in the cover, and the pin set can be provided in the cover to be in corresponding with electrodes in the battery groove, this mode of setting up puts the chargeable batteries and the cover together as a unit, the capacity of electricity storage of it is easier to be distributed, for instance, we can use high efficiency storage chargeable batteries having a capacity of electricity larger than that of the batteries purchased in the markets to render a consumer to use an electric appliance without being subjected to having the situation of stopping operation because of becoming weak of electric power.

In comparison with the prior art, the present invention has the following advantages:

1. When the electric appliance adopts the battery cover of the present invention, it needs not to frequently detach and assemble the chargeable batteries.
2. The electric appliance using the battery cover of the present invention can perform electric charging in a wireless inducing mode.
3. The present invention can avoid the cumbersome problem of collecting electric lines.
4. A consumer needs only to provide new purchased chargeable batteries on the electric appliance, the electric appliance can then be charged with electric power in a wireless inducing mode. In other words, in using the present invention, it needs not to detach and assemble the electric appliance.

The present invention will be apparent after reading the detailed description of the preferred embodiment thereof in reference to the accompanying drawings.

DETAILED DESCRIPTION OF THE PREFERRED EMBODIMENT

Figure 1:
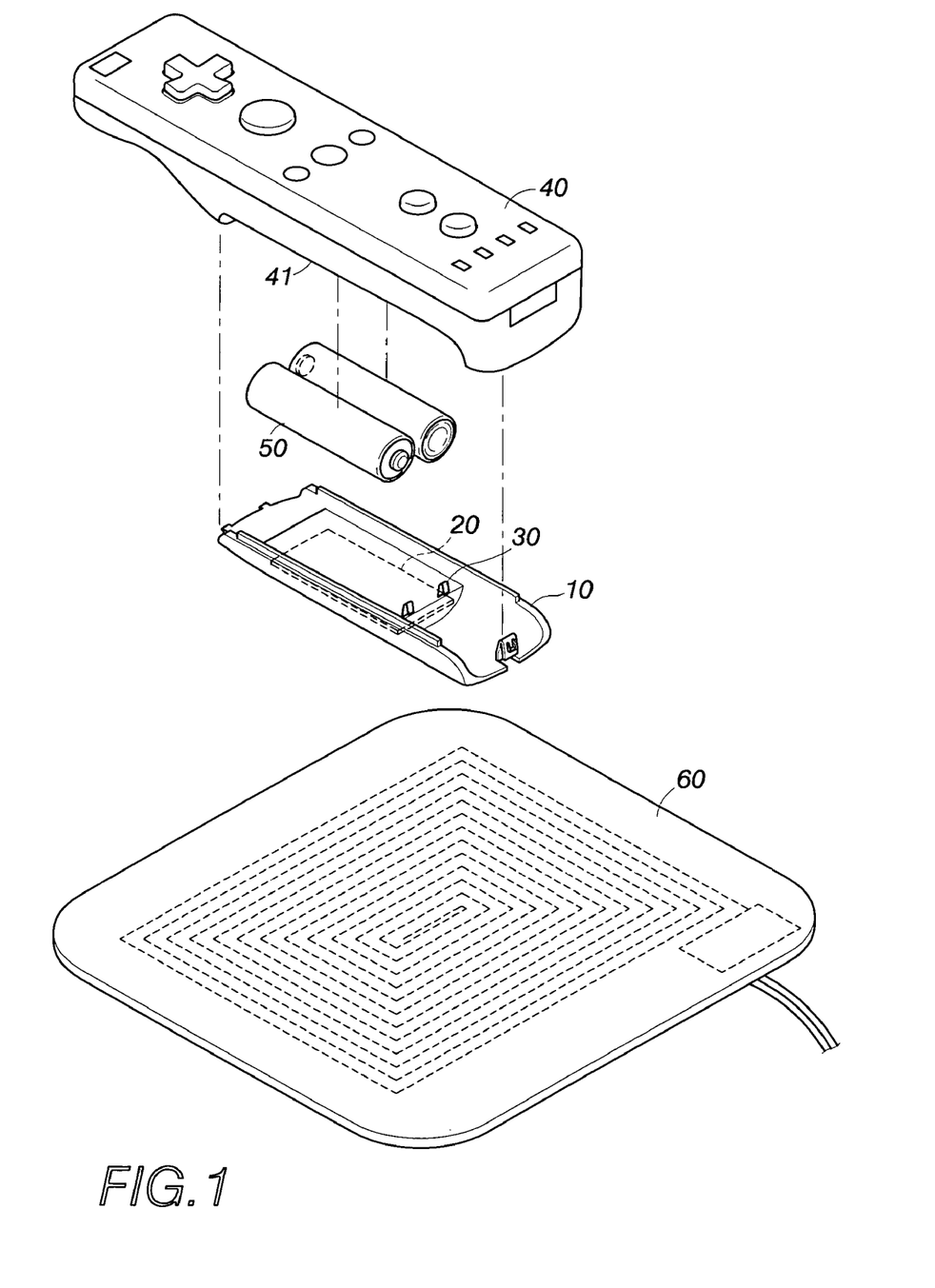
FIG. 1 is an anatomic perspective view of a first preferred embodiment of the present invention.
Figure 2:
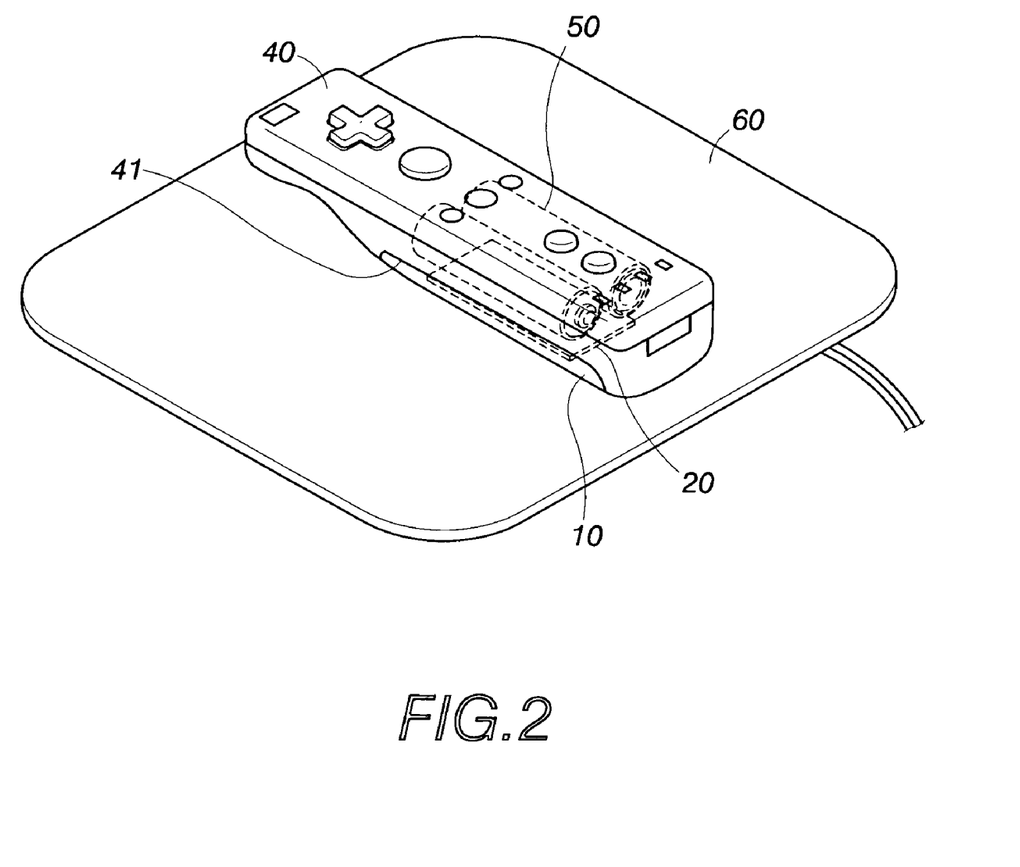
FIG. 2 is a perspective view of the first preferred embodiment of the present invention in use.

As shown in FIG. 1 which is an anatomic perspective view of a first preferred embodiment of the present invention, a battery cover in this embodiment can be placed on an RF (radio frequency) emitter 60, and comprises: a cover 10, a non-touch induction type electric power generating unit 20 provided in the cover 10, and a set of pins 30; the cover 10 is used to cover a battery groove 41 of an electric appliance 40, the electric appliance 40 is supplied with electric power for operation by at least a chargeable battery, the non-touch induction type electric power generating unit 20 is hidden in the cover 10, the pin set 30 can be provided on the cover 10 and direct to the battery groove 41 to electrically connect the chargeable batteries 50; after the battery cover covers of the battery groove 41 of the electric appliance 40, the electric appliance 40 is placed on the RF emitter 60, and electric charging can be performed, its state of use is shown in FIG. 2.

Figure 3:
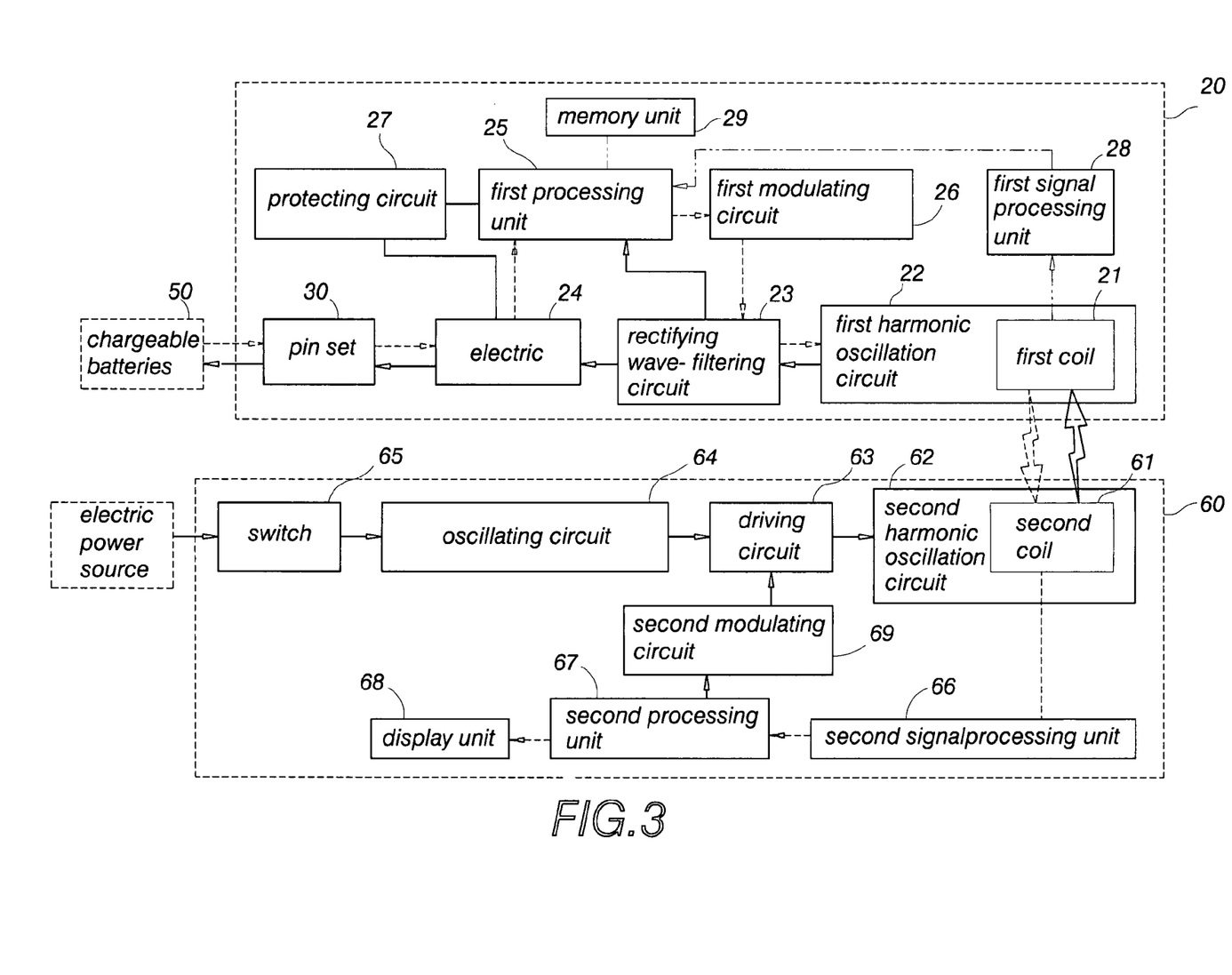
FIG. 3 is a block diagram showing the structure of the first preferred embodiment of the present invention.

As shown in FIGS. 2 and 3 depicting respectively a perspective view of the first preferred embodiment of the present invention in use and a block diagram showing the structure of the first preferred embodiment of the present invention, when a user is desired to electrically charge the chargeable batteries 50, it needs not to take the chargeable batteries 50 out of the electric appliance 40, but needs only to directly place the electric appliance 40 in an effective wireless induction zone of the RF emitter 60, namely, to make the battery cover generate electric power in a wireless inducing mode to charge the batteries 50.

In practice, the above mentioned non-touch induction type electric power generating unit 20 further includes a first coil 21 and a first harmonic oscillation circuit 22 that can get better energy source when it enters the effective RF (radio frequency) signal zone of the RF emitter 60; a rectifying wave-filtering circuit 23 that is connected with the first harmonic oscillation circuit 22 to make the energy source become electric DC current; an electric charging circuit 24 that is connected with the rectifying wave-filtering circuit 23 for charging the chargeable batteries 50 through the set of pins 30; a first processing unit 25 that connects with the electric charging circuit 24 to detect the state of charging of the chargeable batteries 50; and a first modulating circuit 26 that connects between the first processing unit 25 and the rectifying wave-filtering circuit 23 for releasing signals of the state of charging for inducing by the RF emitter 60 via the rectifying wave-filtering circuit 23 and the first coil 21; a protecting circuit 27 that is provided between the first processing unit 25 and the electric charging circuit 24; a first signal processing unit 28 that is connected between the first coil 21 and the first processing unit 25, and a memory unit 29 that is connected with the first processing unit 25.

The RF emitter 60 includes a second harmonic oscillation circuit 62 having a second coil 61, a driving circuit 63 connecting with the second harmonic oscillation circuit 62, an oscillating circuit 64 connecting between the driving circuit 63 and an external electric power source, a switch 65 connecting between the external electric power source and the oscillating circuit 64, a second signal processing unit 66 connected with the second coil 61, a second processing unit 67 connected with the second signal processing unit 66, a display unit 68 connected with the second processing unit 67 to show the state of charging and a second modulating circuit 69 connected between the driving circuit 63 and the second processing unit 67.

When the switch 65 is turned on to make the RF emitter 60 get electric power, it releases RF (radio frequency) signals through the second coil 61; and when the entire electric appliance 40 is directly placed on the RF emitter 60, the first coil 21 is directly in an effective wireless induction zone (a zone that the RF signals can reach), now the non-touch induction type electric power generating unit 20 can generate electric power to charge the chargeable batteries 50 by means of electric charging circuit 24 and the pin set 30.

By the load changing mode of the above mentioned first modulating circuit 26 to transmit data through the first coil 21, the non-touch induction type electric power generating unit 20 releases the signals of the charging state for inducing by the RF emitter 60, and the RF emitter 60 can make the display unit 68 show the charging state of the chargeable batteries 50; the mode of performing of the display unit 68 can be a kind of visual displaying or audio displaying mode etc., for the purpose of reminding a user of the charging state that the chargeable batteries 50 are in; next, by providing the protecting circuit 27, overly charging or discharging of the chargeable batteries 50 can be prevented during the process of charging.

And next, the RF emitter 60 can further release data signals to the non-touch induction type electric power generating unit 20 via the second modulating circuit 69, the driving circuit 63 and the second coil 61 to make the non-touch induction type electric power generating unit 20 receive the data signals from the first coil 21, and to store the received data signals in the memory unit 29 via the first signal processing unit 28 and the first processing unit 25, to help uploading of related parameters required during the process of charging the chargeable batteries 50, for instance: uploading the data of the best charged electric amount of the chargeable batteries 50 that can render the non-touch induction type electric power generating unit 20 to make best controlling of charging on the chargeable batteries 50.

And more, the switch 65 between the external electric power source and the oscillating circuit 64 of the RF emitter 60 can turn on/off the state of operation of the RF emitter 60, and in addition to being a normal manual switch, the switch 65 can also be an inductive switch, in order that when the non-touch induction type electric power generating unit 20 gets close or contact the switch 65, the RF emitter 60 can activate automatically.

The mode of setting up of the above mentioned first embodiment is suitable for use together with normal chargeable batteries 50 purchased in the markets; when the chargeable batteries 50 are damaged or its function of electricity storing is exhausted, a consumer can buy inexpensive chargeable batteries in the market for changing.

Figure 4:
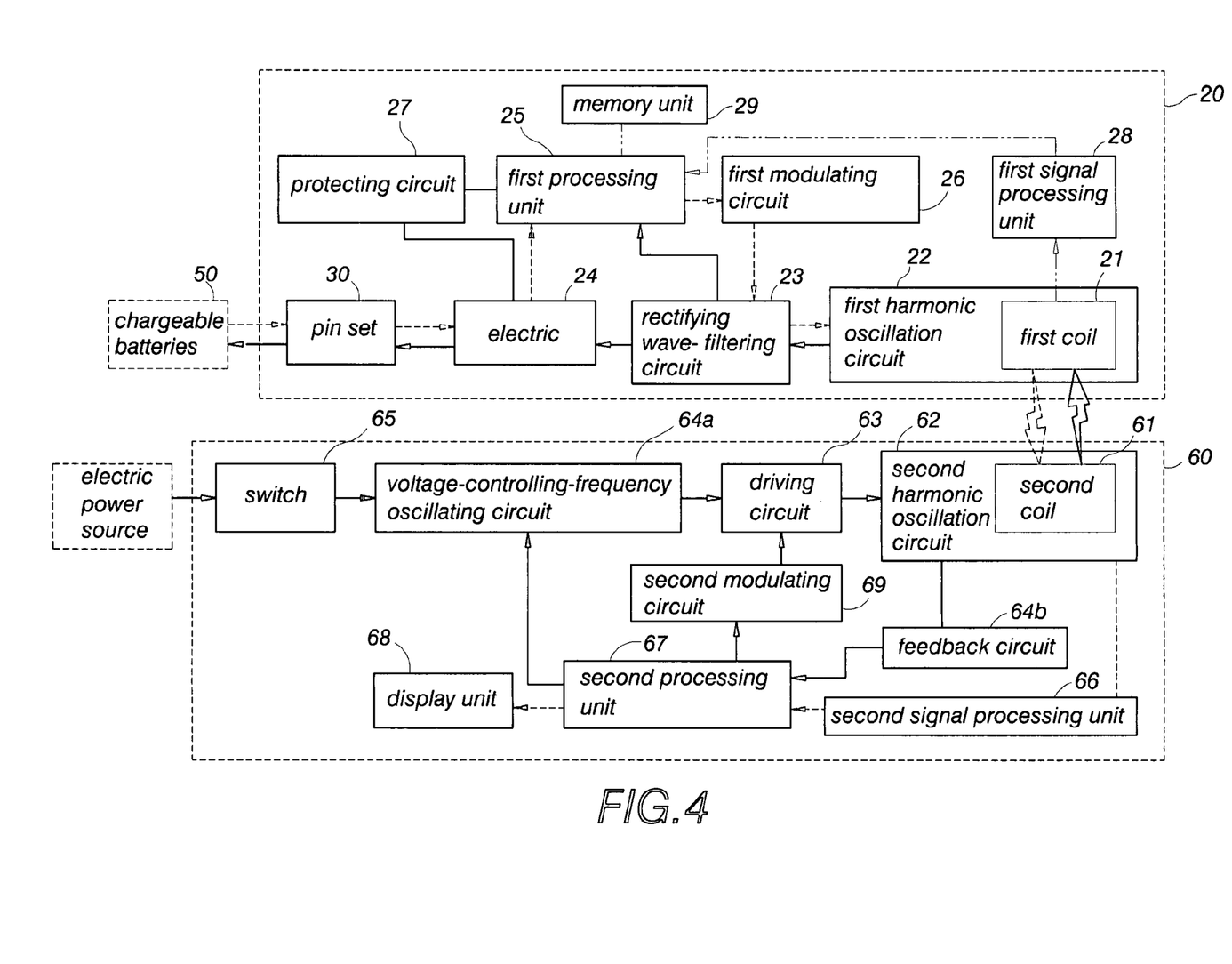
FIG. 4 is a block diagram showing the structure of a second preferred embodiment of the present invention.

Referring to FIG. 4 which is a block diagram showing the structure of a second preferred embodiment of the present invention, for the purpose of rendering the RF emitter 60 to release the best RF signals, the second preferred embodiment changes the oscillating circuit 64 in the first embodiment (FIG. 3) for a voltage-controlling-frequency oscillating circuit 64a, and provides a feedback circuit 64b between the second harmonic oscillation circuit 62 and the second processing unit 67, in order that the RF emitter 60 instantly release the best RF signals in pursuance of the changes of voltage and current.

Figure 5:
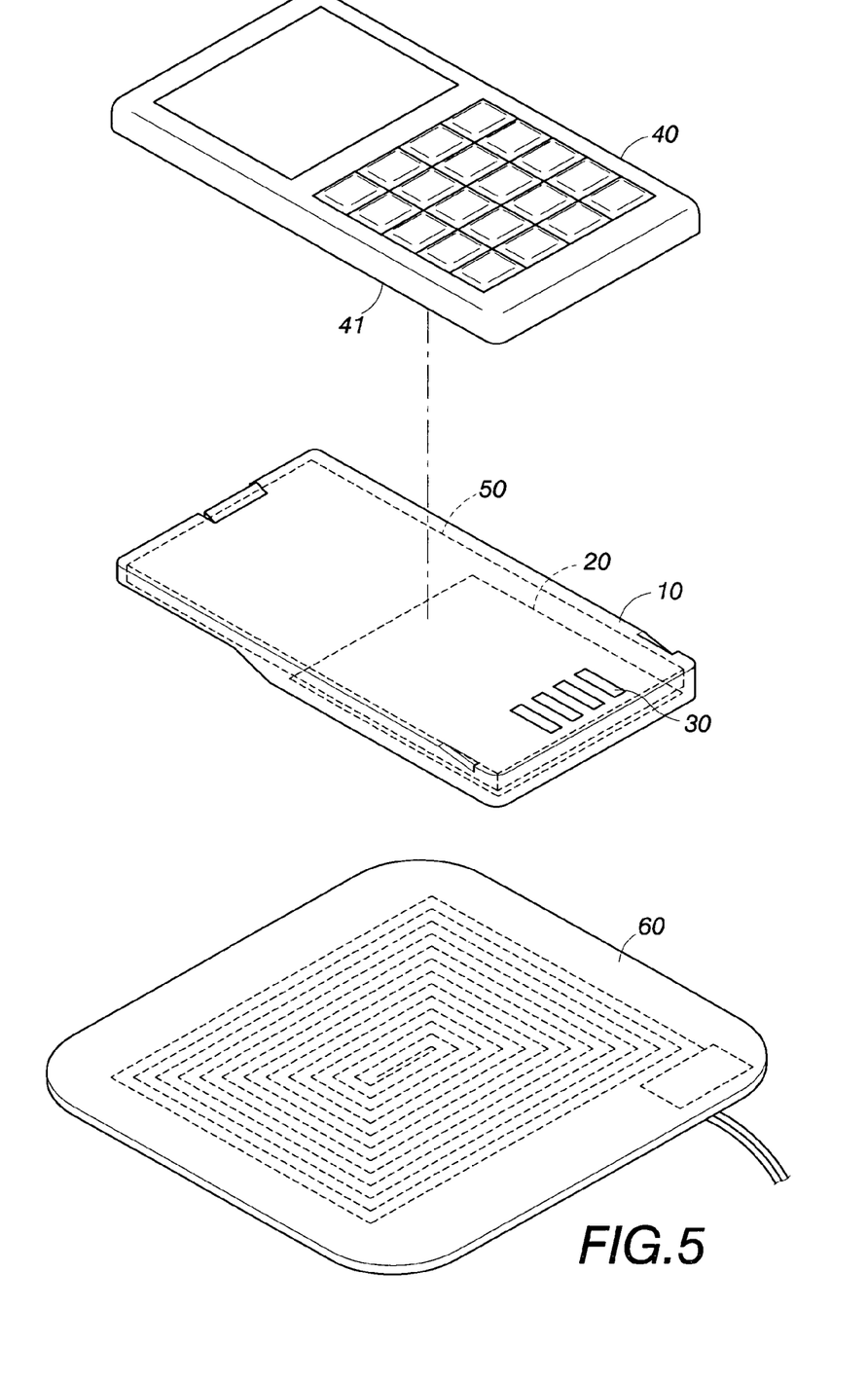
FIG. 5 is an anatomic perspective view of a third preferred embodiment of the present invention.
Figure 6:
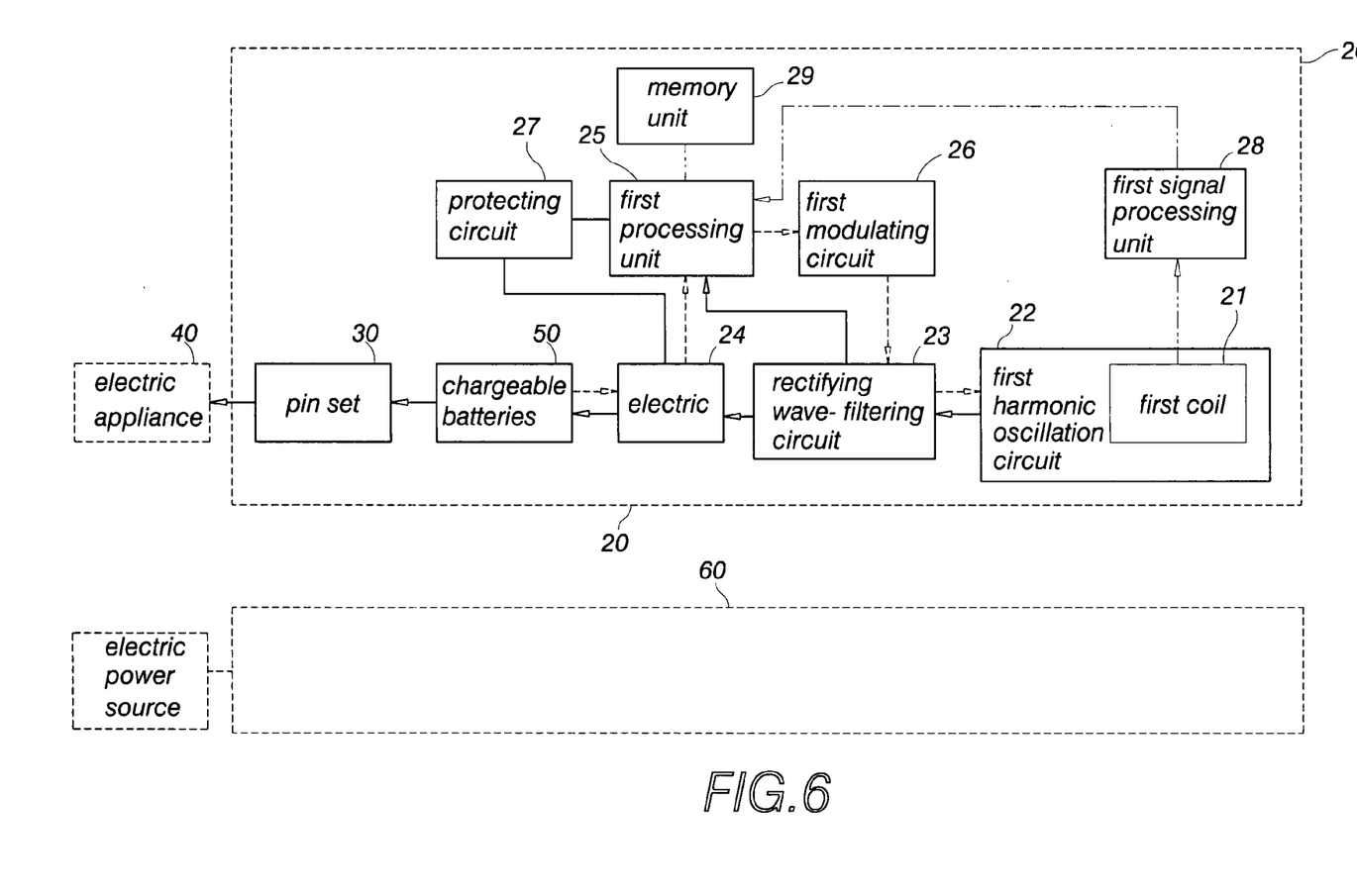
FIG. 6 is a block diagram showing the structure of the third preferred embodiment of the present invention.

FIGS. 5 and 6 are respectively an anatomic perspective view and a block diagram showing the structure of a third preferred embodiment of the present invention, the main difference of the third preferred embodiment from the first and the second preferred embodiments of the present invention is resided in that: the chargeable batteries 50 of the third preferred embodiment are built in the cover 10, and the cover 10 is provided with a pin set 30 in corresponding with the electrodes in the battery groove 41 of the electric appliance 40 (the electric appliance 40 taken for description in this embodiment is a mobile phone), this mode of setting up puts the chargeable batteries 50 and the cover 10 together as a unit, the capacity of electricity storage of the chargeable batteries 50 is easier to be distributed, for instance, we can use high efficiency storage chargeable batteries having a capacity of electricity larger than that of the batteries purchased in the markets to render a consumer to use an electric appliance 40 without being subjected to having the situation of stopping operation because of becoming weak of electric power; As to the RF emitter 60 in the third preferred embodiment, it is same as those used for the first and the second preferred embodiments.

Figure 7:
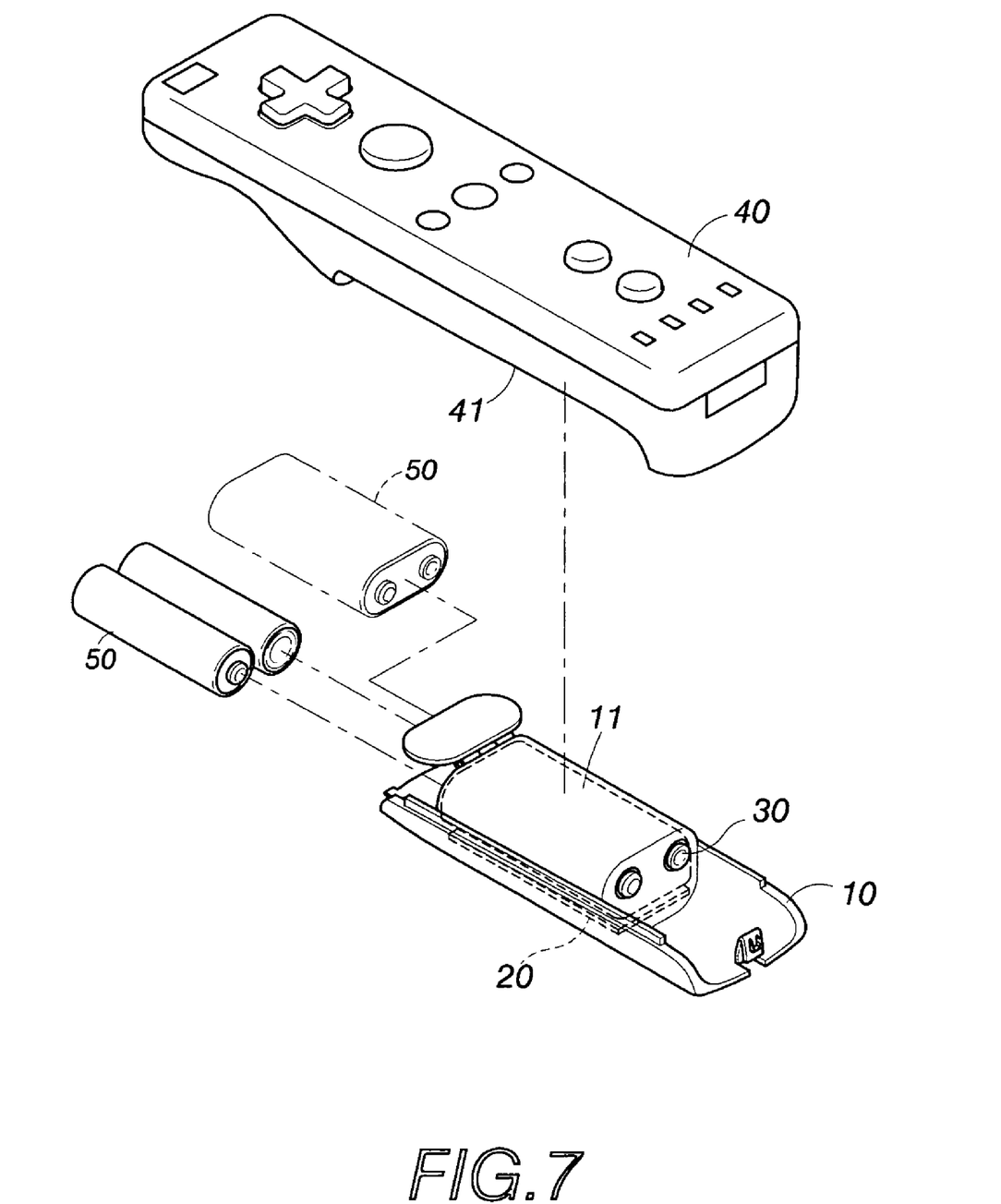
FIG. 7 is an anatomic perspective view of a fourth preferred embodiment of the present invention.

FIG. 7 is an anatomic perspective view of a fourth preferred embodiment of the present invention, in which the cover 10 is provided with a receiving groove 11 for placing and being embedded of chargeable batteries 50 therein, the receiving groove 11 is provided with a pin set 30 in corresponding with the electrodes in a battery groove 41, in addition to loading therein with chargeable batteries 50 purchased in the markets, the receiving groove 11 can be used for loading in and changing of specific chargeable batteries 50.

The embodiment given is only for illustrating the present invention, and not for giving any limitation to the scope of the present invention; for example, the electric appliances in the drawings are game controllers or mobile phones used representatively for description, and the battery covers of the present invention can also be cooperated with battery grooves of other electric appliances to cover battery grooves of other electric appliances such as normal remote controllers, multi-medium players, wireless mice, flashlights, PDAs', digital cameras etc. sold in the markets, consumers need only to provide a battery cover of the present invention on a purchased electric appliance, he can make the electric appliance be electrically charged in the wireless inducing mode. It will be apparent to those skilled in this art that various equivalent modifications or changes without departing from the spirit of this invention shall also fall within the scope of the appended claims.

The invention claimed is:

1. A battery cover adapted to placing on an RF (radio frequency) emitter for electrically charging in a non-touch induction mode, said battery cover at least comprises:
   a cover used to cover a battery groove of an electric appliance, and having a set of pins directing to said battery groove to electrically connect with chargeable batteries; and
   a non-touch induction type electric power generating unit provided in said cover, said non-touch induction type electric power generating unit being adapted to generating RF signals of an RF emitter to generate electric power by inducing, and electrically charging said chargeable batteries through said set of pins,
   wherein said non-touch induction type electric power generating unit includes:
      a first harmonic oscillation circuit having a first coil and being adapted to getting better energy source when it enters an effective RF signal zone of said RF (radio frequency) emitter;
      a rectifying wave filtering circuit connecting with said first harmonic oscillation circuit, to make said energy source become electric DC current;
      an electric charging circuit connecting with said rectifying wave filtering circuit for charging said chargeable batteries through said set of pins;
      a first processing unit connecting with said electric charging circuit to detect state of charging of said chargeable batteries; and
      a first modulating circuit connecting between said first processing unit and said rectifying wave-filtering circuit for releasing signals of state of charging by a load changing mode to transmit data through said first coil for inducing by said RF emitter.

2. The battery cover as in claim 1, wherein: said RF emitter includes a second harmonic oscillation circuit having a second coil, a driving circuit connecting with said second harmonic oscillation circuit, an oscillating circuit connecting between said driving circuit and an external electric power source, a second signal processing unit connected with said second coil, a second processing unit connected with said second signal processing unit, and a display unit connected with said second processing unit to show state of charging.

3. The battery cover as in claim 1, wherein: said RF emitter further includes a second harmonic oscillation circuit having a second coil, a driving circuit connecting with said second harmonic oscillation circuit, a voltage-controlling-frequency oscillating circuit connected with said driving circuit, a second signal processing unit connected with said second coil, a second processing unit connected with said second signal processing unit, a display unit connected with said second processing unit to show state of charging, and a feedback circuit connecting between said voltage-controlling-frequency oscillating circuit and said second processing unit.

4. The battery cover as in claim 3, wherein: said RF emitter further includes a second modulating circuit connected between said second processing unit and said driving circuit, said non-touch induction type electric power generating unit further includes a first signal processing unit connected between said first coil and said first processing unit, and a memory unit connected with said first processing unit.

5. The battery cover as in claim 4, wherein: said memory unit is one chosen from FLASH and EEPROM.

6. The battery cover as in claim 3, wherein: said RF emitter further includes a switch.

7. The battery cover as in claim 6, wherein: said switch is an inductive switch.

8. The battery cover as in claim 1, wherein: said non-touch induction type electric power generating unit includes a protecting circuit provided between said first processing unit and said electric charging circuit.

9. A battery cover adapted to placing on an RF (radio frequency) emitter for electrically charging in a non-touch induction mode, said battery cover at least comprises:
   a cover used to cover a battery groove of an electric appliance, having chargeable batteries and a set of pins directing to said battery groove to be in corresponding with electrodes in said battery groove; and
   a non-touch induction type electric power generating unit provided in said cover, said non-touch induction type electric power generating unit being adapted to generating RF signals of an RF emitter to generate electric power by inducing, and electrically charging said chargeable batteries through said set of pins for power supplying for an electric appliance,
   wherein said non-touch induction type electric power generating unit includes:
      a first harmonic oscillation circuit having a first coil and being adapted to getting better energy source when it enters an effective RF signal zone of said RF emitter:
      a rectifying wave filtering circuit connecting with said first harmonic oscillation circuit, to make said energy source become electric DC current;
      an electric charging circuit connecting with said rectifying wave filtering circuit for charging said chargeable batteries;
      a first processing unit connecting with said electric charging circuit to detect state of charging of said chargeable batteries;
      a first modulating circuit connecting between said first processing unit and said rectifying wave-filtering circuit for releasing signals of state of charging by a load changing mode to transmit data through said first coil for inducing by said RF emitter; and a protecting circuit connecting with said first processing unit and said electric charging circuit.

10. The battery cover as in claim 9, wherein: said RF emitter includes a second harmonic oscillation circuit having a second coil, a driving circuit connecting with said second harmonic oscillation circuit, an oscillating circuit connecting between said driving circuit and an external electric power source, a second signal processing unit connected with said second coil, a second processing unit connected with said second signal processing unit, a display unit connected with said second processing unit to show state of charging.

11. The battery cover as in claim 9, wherein: said RF emitter further includes a second harmonic oscillation circuit having a second coil, a driving circuit connecting with said second harmonic oscillation circuit, a voltage-controlling-frequency oscillating circuit connected with said driving circuit, a second signal processing unit connected with said second coil, a second processing unit connected with said second signal processing unit, a display unit connected with said second processing unit to show state of charging, and a feedback circuit connecting between said voltage-controlling-frequency oscillating circuit and said second processing unit.

12. The battery cover as in claim 11, wherein: said RF emitter further includes a second modulating circuit connected between said second processing unit and said driving circuit, said non-touch induction type electric power generating unit further includes a first signal processing unit connected between said first coil and said first processing unit, and a memory unit connected with said first processing unit.

13. The battery cover as in claim 12, wherein: said memory unit is one chosen from FLASH and EEPROM.

14. The battery cover as in claim 9, wherein: said RF emitter further includes a switch.

15. The battery cover as in claim 14, wherein: said switch is an inductive switch.

16. The battery cover as in claim 9, wherein: said non-touch induction type electric power generating unit includes a protecting circuit provided between said first processing unit and said electric charging circuit.

17. The battery cover as in claim 9, wherein: said cover is provided with a receiving groove for placing chargeable batteries therein.

* * * * *